United States Patent [19]

Yamada et al.

[11] 4,048,071

[45] Sept. 13, 1977

[54] LIQUID FILTERING DEVICE

[76] Inventors: Yoshio Yamada, 101-118, Hatta, Higashi, Fukuoka, Fukuoka; Yoneji Wada, 1-1, Hakataekimae 2-Chome, Hakata, Fukuoka, Fukuoka, both of Japan

[21] Appl. No.: 624,882

[22] Filed: Oct. 22, 1975

Related U.S. Application Data

[63] Continuation of Ser. No. 461,435, April 15, 1974, abandoned.

[51] Int. Cl.² .................. B01D 35/00; B01D 35/14
[52] U.S. Cl. .................. 210/90; 55/482; 55/520; 210/99; 210/111; 210/130; 210/232; 210/253; 210/255; 210/261; 210/262; 210/282; 210/317; 210/339; 210/340; 210/488; 210/494 M; 210/497.1
[58] Field of Search ........... 210/90, 106, 130, 232, 210/253, 255, 261, 314, 316, 317, 335, 337, 339, 340, 488, 492, 494, 497.1, 323, 282, 489, 133, 97, 111, 99, 262; 55/520, 482

[56] References Cited

U.S. PATENT DOCUMENTS

| 2,141,903 | 12/1938 | Brundage | 210/494 |
| 2,173,978 | 9/1939 | Pennebaker | 210/494 |
| 2,647,637 | 8/1953 | Leet | 210/494 |
| 2,868,383 | 1/1959 | Nicolls | 210/494 |
| 2,895,615 | 7/1959 | Oathout | 210/494 |
| 2,928,547 | 3/1960 | Lawrence | 210/494 |
| 3,146,757 | 9/1964 | Heymann et al. | 210/90 |
| 3,722,696 | 3/1973 | Dwyer | 210/494 |

Primary Examiner—Frank W. Lutter
Assistant Examiner—Frank Sever
Attorney, Agent, or Firm—Wenderoth, Lind & Ponack

[57] ABSTRACT

The peripheral surface of a coil of a filter web wound about a hollow shaft is covered by a liquid impervious flexible coating, and the outer periphery of a first end of the coil is secured to a supporting disc so that when liquid to be filtered is caused to pass through the coil in the axial direction thereof, the convolutions of the coil near a second end expand radially outwardly to trap contaminants in the spiral gap. Purified liquid collected at the first end of the coil is discharged through the hollow shaft. The filter unit is constructed such that a number of units can be readily connected in series.

1 Claim, 8 Drawing Figures

LIQUID FILTERING DEVICE

This is a continuation of application Ser. No. 461,435, filed Apr. 15, 1974, now abandoned.

BACKGROUND OF THE INVENTION

This invention relates to a liquid filtering device for removing solid contaminants from liquid such as oil. Conventional liquid filters can be classified into two types, one utilizing surface layer filtering action and the other deep layer filtering action. According to the former, the contaminants in the liquid are trapped at and removed by the surface of a filter material, whereas according to the latter, the contaminants are trapped by the wall of the capillary passages, interstices or small voids in the filter material. With the surface layer filtering, as the contaminants deposit on the surface of the filter material the passages through the material are clogged by the deposited contaminants with the result that the resistance against the flow of the liquid increases gradually. For this reason, the filter material is required to have sufficiently large surface area.

On the other hand, with the deep layer filtering, as all wall surfaces of small voids or capillary tubes are efficiently used to trap the contaminants, it is possible to trap a large quantity of contaminants even with a filter of relatively small volume. However, in the filter of this type too, the liquid passages will be ultimately clogged by the trapped contaminants. Further, when mounting a filter material having a substantial thickness in the casing of a filtering device it is difficult to maintain at a sufficiently liquid tight condition the contact surface between the filter material and the casing.

For this reason, according to an established theory of filtering, with a filtering material of a definite volume, it is possible to treat only a definite volume of the liquid under prescribed conditions so that it is necessary to frequently clean or renew the filter material.

In certain cases, a primary filter unit for removing relatively coarse solid contaminants, and a secondary filter unit for removing relatively fine solid contaminants are connected in series in the same tank. In such an installation, the primary filter unit will be relatively quickly clogged by the trapped contaminants so that it is necessary to frequently renew the primary filtering unit. Accordingly, it is desirable to provide means for determining the degree of clogging or the remaining filtering capability of the primary filter unit to enable exchange thereof at a proper time.

SUMMARY OF THE INVENTION

Accordingly, it is an object of this invention to provide an improved filtering device having a compact construction, yet having a long operating life.

Another object of this invention is to provide an improved filtering device capable of manifesting the advantages of both surface layer type and deep layer type.

Still another object of this invention is to provide a novel filtering device which is constructed as a standard unit so that any member of such standard units can be readily connected in cascade to construct filtering devices of any desired capacity.

A further object of this invention is to provide a novel filtering device provided with means for determining the degree of clogging of the filter device, thereby providing an alarm or indication of the time for renewal thereof.

According to this invention there is provided a filtering device comprising a hollow shaft provided with a radial opening through its wall, a coil of a spirally wound filter web liquid tightly mounted on the hollow shaft above the radial opening, a liquid impervious flexible coating covering the peripheral surface of the coil, a supporting disc secured to the hollow shaft below the radial opening for liquid tightly securing the periphery of a first end of the coil, thereby defining a space between the first end of the coil and the supporting disc, and means for passing liquid containing solid contaminants axially through the coil from a second end toward the first end thereof, thereby causing the convolutions of the coil near the second end to expand radially outwardly to trap the contaminants and causing the purified liquid collected in the space to flow to the outside through the radial opening and the interior of the hollow shaft.

According to another aspect of this invention, there is provided a filtering device comprising a tank, a first filter unit for removing relatively coarse contaminants, a second filter unit for removing relatively fine contaminants, the first and second filter units being connected in cascade in the tank, means for supplying liquid containing the contaminants to the inlet side of the first filter unit, means for discharging to the outside of the tank the purified liquid collected on the outlet side of the second filter unit, and means responsive to the pressure difference between the inlet and outlet sides of the first filter unit for determining the amount of the contaminants collected by the first filter unit.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
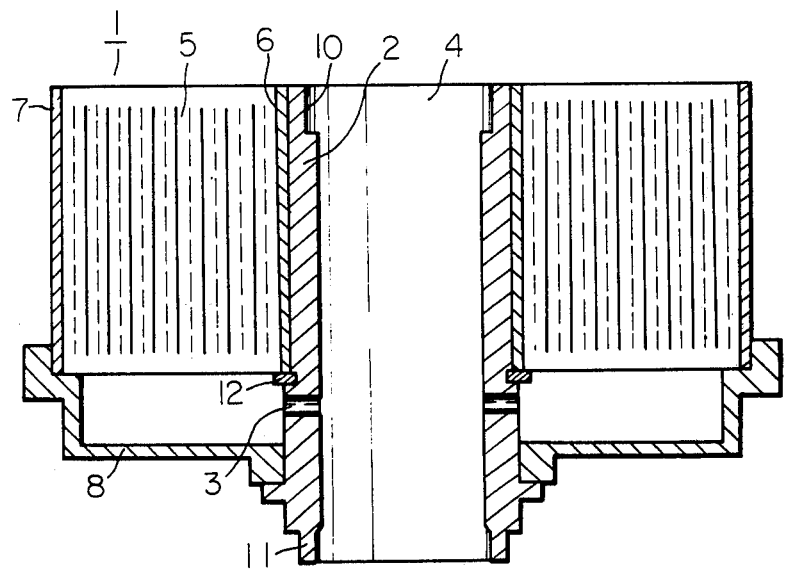
FIG. 1 shows a longitudinal section of a filter device embodying the invention.
Figure 2:
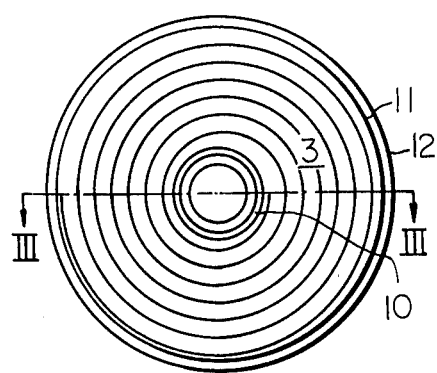
FIG. 2 shows a top plan view of the filter unit only shown in FIG. 1.
Figure 3:
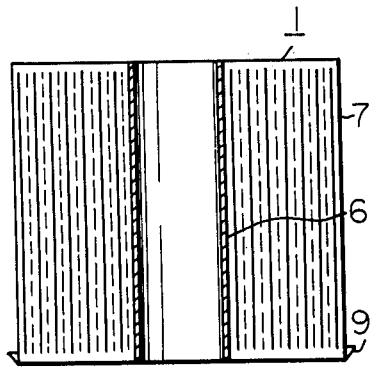
FIG. 3 is a longitudinal sectional view of a coil of a filter web taken along a line III — III shown in FIG. 2.

Referring now to FIG. 1 of the accompanying drawings, the filter unit shown therein comprises a hollow shaft 2 and a coil 1 of a filter web 5 wound spirally about a bobbin 6. The periphery of the coil 1 is covered by a flexible coating 7 made of a material impervious to liquid such as polyethylene, polypropylene, vinyl chloride or like synthetic resins and a metal foil. The filter web may be made of any porous material such as a filter paper having a thickness of from 0.1 to 0.85 mm, for example. The outer periphery of one end of the coil 1 is supported by a supporting disc 8 which is liquid tightly secured to the peripheral surface of the hollow shaft 2 while the inner periphery of the coil 1 is supported by a snap ring 12 mounted on the hollow shaft. A flexible collar 9 (see FIG. 3), preferably made of the same material as the coating 7, is secured to the lower end of the coating 7 for the purpose of liquid tightly sealing the interface between the coating and the supporting disc 8. The upper end 4 of the hollow shaft 2 is recessed as at 10 and a hollow projection 11 having an outer diameter which is the same as the inner diameter of recess 10 is provided at the lower end so as to enable to pile up a plurality of filter units in the vertical direction by fitting the projection 11 of a upper unit in the recess 10 of a lower unit as will be described later. One or more radial passages 3 are provided through the wall of the hollow shaft 2 to communicate an annular chamber beneath the coil 1 with the interior of the hollow shaft.

In operation, the filter unit is immersed in a tank containing the liquid to be filtered with one end of the shaft 2 closed and the liquid is forced to pass through the coil in the axial direction by applying a pressure or suction force which is applied through the open end of shaft 2. Then the contaminants are removed while the liquid flows from upper toward lower through the coil 1 and the purified liquid is discharged to outside through opening 3 and hollow shaft 2.

Figure 4:
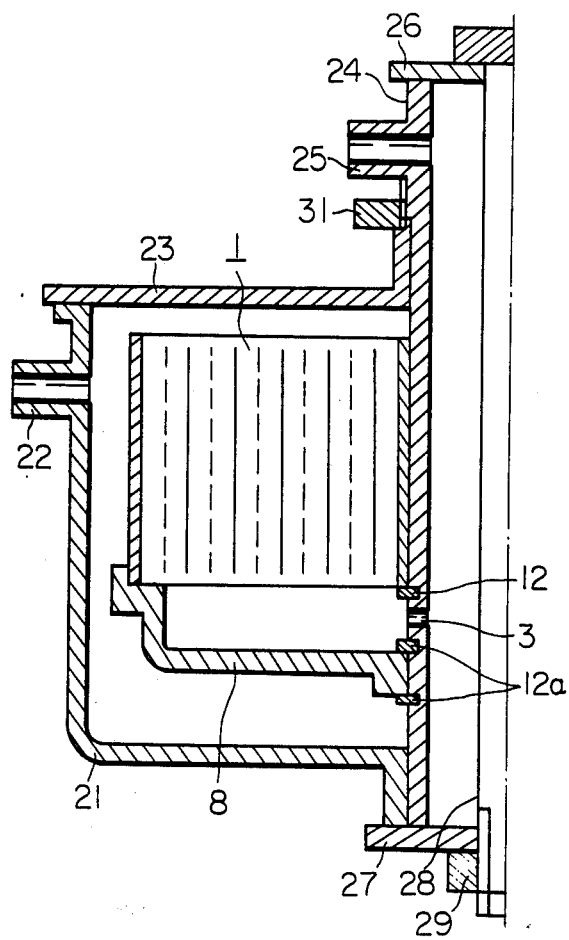
FIGS. 4 and 5 are longitudinal sectional views of various embodiments of this invention.

FIG. 4 shows a longitudinal section of a filtering device wherein a single filter coil or unit 1 is mounted in a cup shaped casing 21 which is provided with an inlet opening 22 for the liquid and a lid 23 for closing the upper end of the casing 21. In this case, the opposite ends of a hollow shaft 24 project to the outside of the casing 21 and one of the projected ends is provided with a discharge opening 25 located above lid 23 for the purified liquid. A pair of cover plates 26 and 27 are urged against the opposite ends of the shaft 24 by means of a bolt 28 and a nut 29. The coil is supported by supporting disc 8 and a snap ring 12 as before but the supporting disc 8 is secured to shaft 24 by means of snap rings 12a. Instead of projecting the lower end of shaft 24 through the bottom of casing 21 as shown in FIG. 4, the lower end of the shaft may be urged in a liquid tight fashion against the bottom of the casing.

The liquid to be filtered is admitted into casing 21 and flows downwardly through the coil and the purified liquid is discharged through passage 3, hollow shaft 24 and discharge opening 25.

According to the capacity of the filtering device a plurality of the filter units may be mounted along the length of a common hollow shaft.

Figure 5:
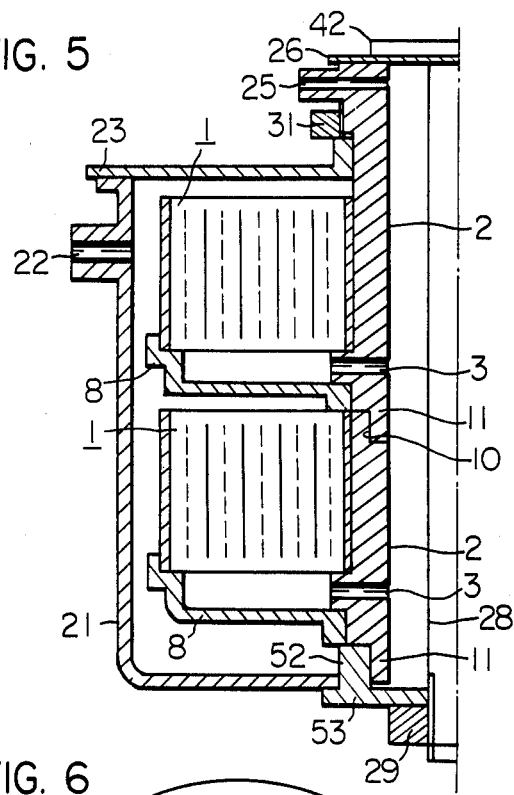

FIG. 5 shows a modification of such arrangement in which two or more filter units similar to that shown in FIG. 1 are connected in cascade in the vertical direction by fitting projection 11 of the upper unit in recess 10 of the lower unit. Where three or more units are connected in cascade the intermediate units and the lowermost unit may have the same construction as that shown in FIG. 1, but the hollow shaft 2 of the uppermost unit extends through lid 23 is and clamped thereto by means of a nut 31. The projection 11 of the lowermost unit fits in an annular collar 52 on the inside of a lower lid 53 which is welded to the bottom of casing 21. The piled up units are clamped together by means of bolt 28 and nut 29 in the same manner as in FIG. 4.

Figure 6:
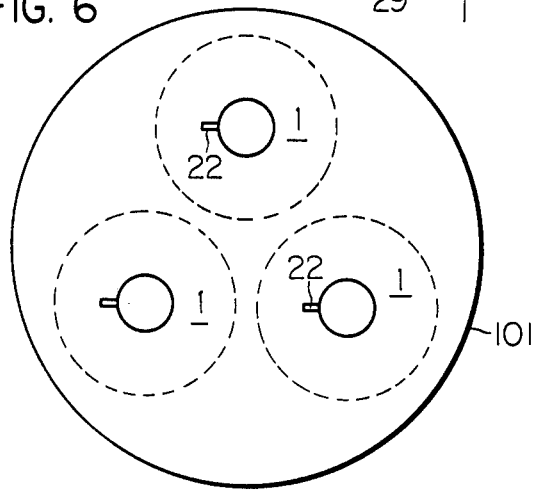
FIG. 6 is a plan view of a modified filtering device.

Although in the embodiments shown in FIG. 5 a plurality of filter units are piled up vertically and operated in parallel, where the height is limited, a plurality of filter units 1 may be disposed side by side in a single casing 101 having a large diameter, as shown in FIG. 6.

The lower end of a coil of filter web surrounded by a flexible impervious coating is held by the supporting disc 8 whereas its upper end is free to expand in the radial direction by the liquid pressure so that coarse particles of the solid contaminants are trapped in the upper portion of the spiral gap between successive convolutions of the spiral filter web and fine particles are trapped in the lower portion. For this reason, it is not necessary to increase the density of the filter web, or to decrease the size of the interstices or pores in the filter web toward the bottom as in a conventional filter wherein a plurality of flat sheets of filter paper are laminated in the vertical direction. In other words, the filter unit of this invention can manifest the characteristics of both the surface layer type and the deep layer type, thus lengthening the period for renewal of the clogged filter unit. Furthermore, the invention provides a filter unit of novel construction permitting ready cascade connection.

Figure 7:
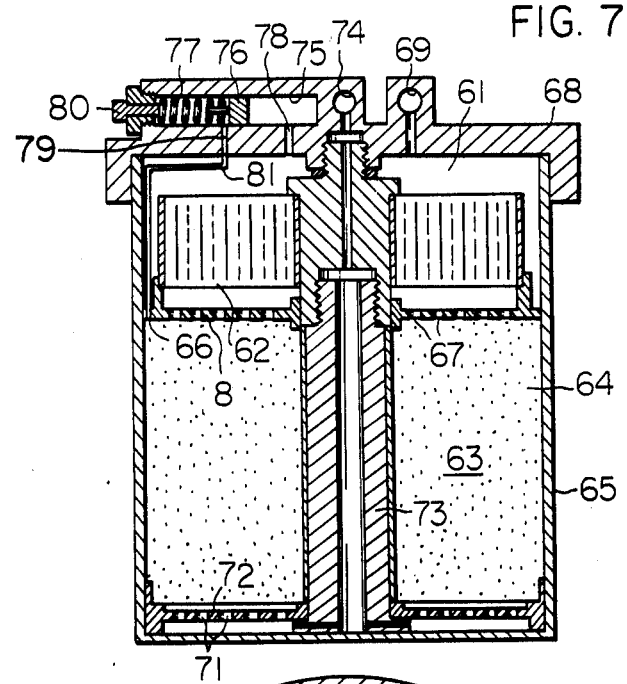
FIG. 7 is a longitudinal sectional view of a modified embodiment of this invention.

A filtering device shown in FIG. 7 comprises a first filtering chamber 61 containing a first filter unit 62 similar to that shown in FIG. 1 for removing relatively coarse contaminants, and a second filtering chamber 63 containing a second filter unit 64 comprising a fine powder of an organic or inorganic filter material such as diatomaceous earth, fullers earth, activated carbon etc., for removing relatively fine solid contaminants or contaminants dissolved in the liquid. In this embodiment, the supporting disc 8 of the first filter unit is provided with a radial flange 66 for dividing the interior of a tank or casing 65 into the first and second filtering chambers 61 and 63 and a plurality of perforations 67 for passing the liquid purified by the first filter unit 62 into the second filtering chamber 63. The tank 65 is closed by a cover plate 68 and the liquid to be purified is supplied into the first filtering chamber 61 through an opening 69 to pass through the coil of the first filter unit 62 in the axial direction thereof. The coarse solid contaminants are removed by the first filter unit in a manner described above and the water primarily purified by the first filter unit 62 flows into the second filtering chamber 63 through perforations 67 and is further purified by the second filter unit 64. The water purified by the second filter unit flows to the outside through perforations 71 of a supporting disc 72 at the bottom of the second filter unit, through hollow shaft 73 and through a discharge opening 74 provided in the cover plate 68.

In accordance with this invention, means for detecting the degree of clogging or the remaining filtering capability of the first filter unit 62 is provided comprising a cylinder 75 formed in the cover plate 68, a differential piston 76 slidable in the cylinder, a spring 77 for biassing the piston toward the right as viewed in FIG. 7, and a microswitch 80 operated by the piston 76. The interior of the cylinder on one side of the piston 76 is communicated with the inlet side of the first filter unit 62 via a passage 78 through the cover plate 68, while the interior of the cylinder on the opposite side of the piston is communicated with the outlet side of the first filter unit 62 or the inlet side of the second filter unit 64 via a passage 79 through the cover plate 68, and a conduit 81, and a passage 66 extending through the supporting disc 8 for the first filter unit 62. As the contaminants are trapped the pressure difference between the inlet and outlet sides of the first filter unit 62 increases, so that when its filtering capability decreases, the piston 76 is moved to the left against the bias of spring 77 whereby switch 80 is closed to operate an alarm or a lamp, not shown, to inform that the life of the first filter unit is exhausted and it must be exchanged by a new one. At the same time, the liquid on the inlet side is supplied directly into the second filtering chamber through passages 78, 79 and conduit 81. If desired similar device may be provided for the second filter unit.

Figure 8:
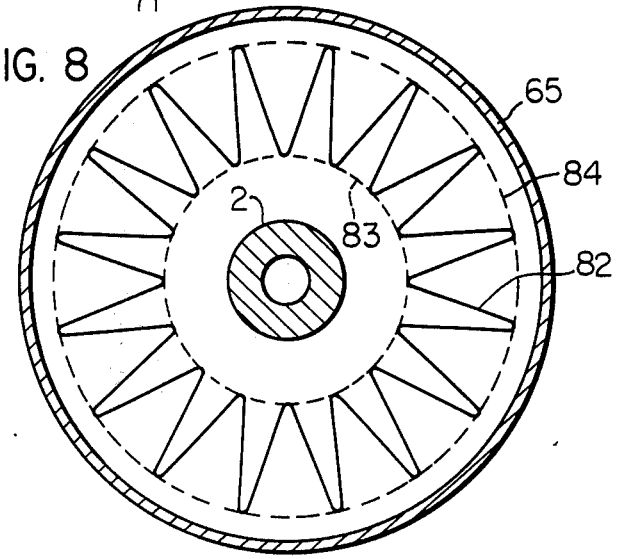
FIG. 8 shows a cross sectional view of a modified filter unit utilized in the filter device shown in FIG. 7.

In another modification, the first filter unit including a coil of a spirally wound filter web shown in FIG. 7 is preplaced by a zig-zag shaped filter paper 82, as shown in FIG. 8. In this case, the filter paper is formed into an annulus about hollow shaft 2 and disposed between a pair of perforated cylinders 83 and 84. The liquid to be filtered is supplied into inner cylinder 83 and flows outwardly through filter paper 82 and perforations of the cylinders 83 and 84 and then into the second filtering chamber. In this case, conduits 78 and 79 are connected to the inside of inner cylinder 83 and to the outside of outer cylinder 84, respectively. In this embodiment the contaminants are accumulated on the inner surface of the filter paper 82 in the form of a cake and when the pressure differential between the inside and outside of the filter paper exceeds a predetermined value, piston 76 (not shown) operates in the same manner as has been described in connection with FIG. 7.

What is claimed is:

1. A filter device comprising:
    a tank covered by a cover plate;
    a hollow shaft within said tank, said shaft having a radial opening through the wall thereof;
    a first filter unit for removing relatively coarse contaminants;
    a second filter unit for removing relatively fine contaminants;
    said first and second filter units being connected in cascade in said tank with said first filter unit above said second filter unit;
    said first filter unit comprising:
        a coil of spirally wound filter web which is liquid tightly mounted about said hollow shaft;
        a liquid impervious flexible coating covering the outer peripheral surface of said coil;
        supporting disc means, secured to said hollow shaft and liquid tightly contacting the outer periphery of a first, lower end of said coil, for radially receiving and positioning said first, lower end of said coil;
        a space being defined between said first, lower end of said coil and said supporting disc means; and
        said coil having a second, upper end, the outer periphery of which is unsupported and radially unrestrained, said filter web of said second, upper end of said coil having the property of being free, upon the receipt and absorption thereby of liquid, to expand radially;
    means for supplying liquid containing solid contaminants into said second, upper end of said coil of said first filter unit and passing said liquid axially through said coil from said second, upper end to said first, lower end thereof, for causing said filter web of said second, upper end of said coil to radially expand and thereby trap relatively coarse contaminants, for then passing said liquid still having therein relatively fine contaminants through said second filter unit and thereby purify said liquid, and for passing the thus purified liquid through said radial opening and into the interior of said hollow shaft; and
    means responsive to the pressure differences between the inlet and outlet sides of said first filter unit for determining the amount of said contaminants collected by said first filter unit, said pressure difference responsive means comprising:
        a cylinder formed in said cover plate of said tank;
        a piston slidably positioned in said cylinder;
        a first passage communicating the interior of said cylinder on a first side of said piston with said inlet side of said first filter unit;
        a second passage communicating the interior of said cylinder on a second side of said piston with said outlet side of said first filter unit;
        a spring positioned in said cylinder and in contact with said second side of said piston; and
        a switch mounted on said cover plate at a position to be operated by said piston when said piston is moved against the force of said spring by a pressure difference between said inlet and outlet sides of said first filter unit.

* * * * *

UNITED STATES PATENT AND TRADEMARK OFFICE
CERTIFICATE OF CORRECTION

PATENT NO. : 4,048,071
DATED : September 13, 1977
INVENTOR(S) : Yoshio YAMADA and Yoneji WADA It is certified that error appears in the above-identified patent and that said Letters Patent are hereby corrected as shown below:

On the title page add the following:
-- Assignee: Toshiba Kikai Kabushiki Kaisha
   of Tokyo-To, Japan --.

Signed and Sealed this

Twenty-fourth Day of October 1978

[SEAL]

Attest:

RUTH C. MASON
*Attesting Officer*

DONALD W. BANNER
*Commissioner of Patents and Trademarks*